Sept. 4, 1923.
J. W. GHEEN
1,466,876
MACHINE FOR DISPLAYING RUGS, CARPETS, AND OTHER LIKE ARTICLES
Filed April 11, 1921  5 Sheets-Sheet 1
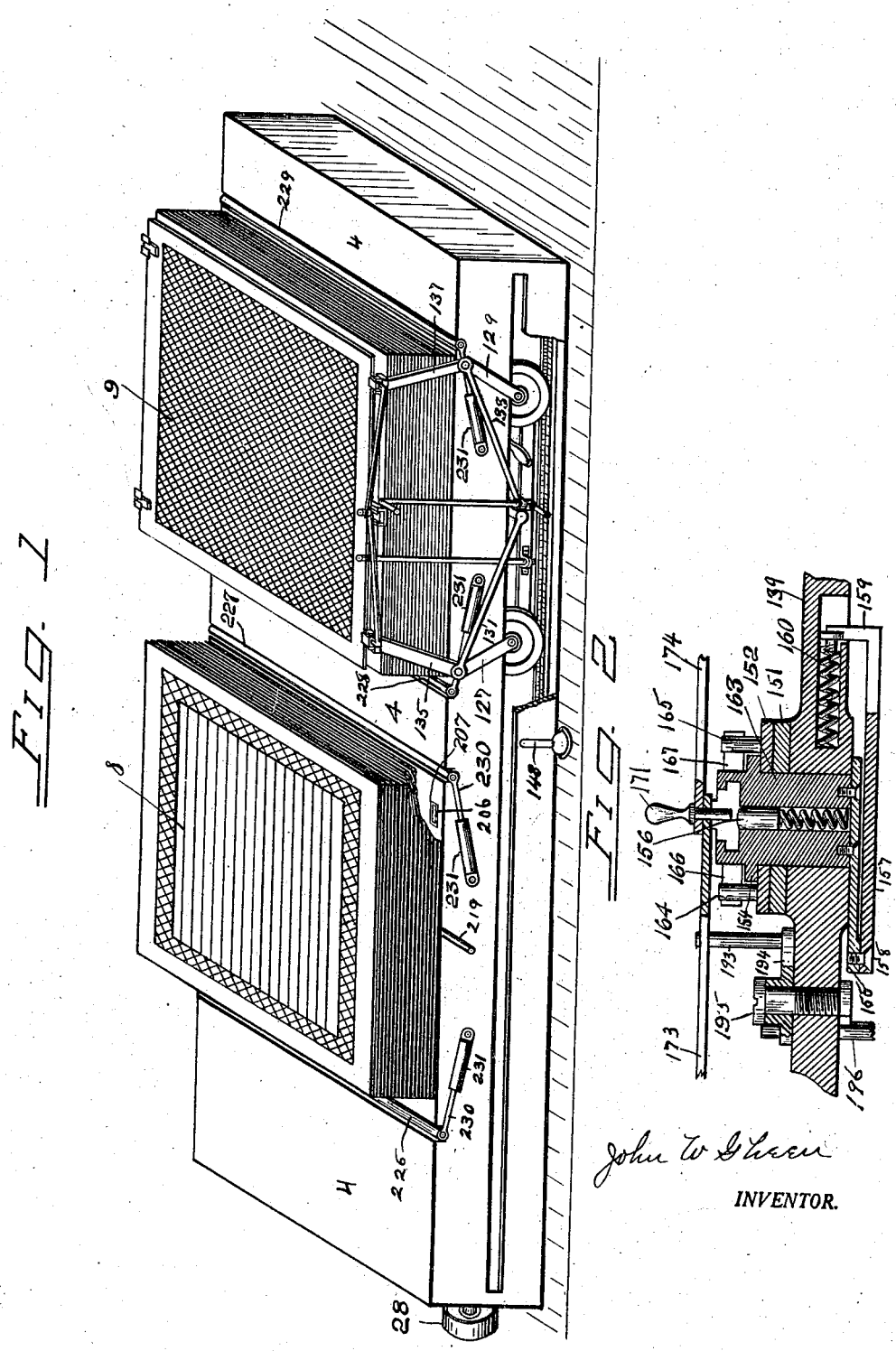
INVENTOR.

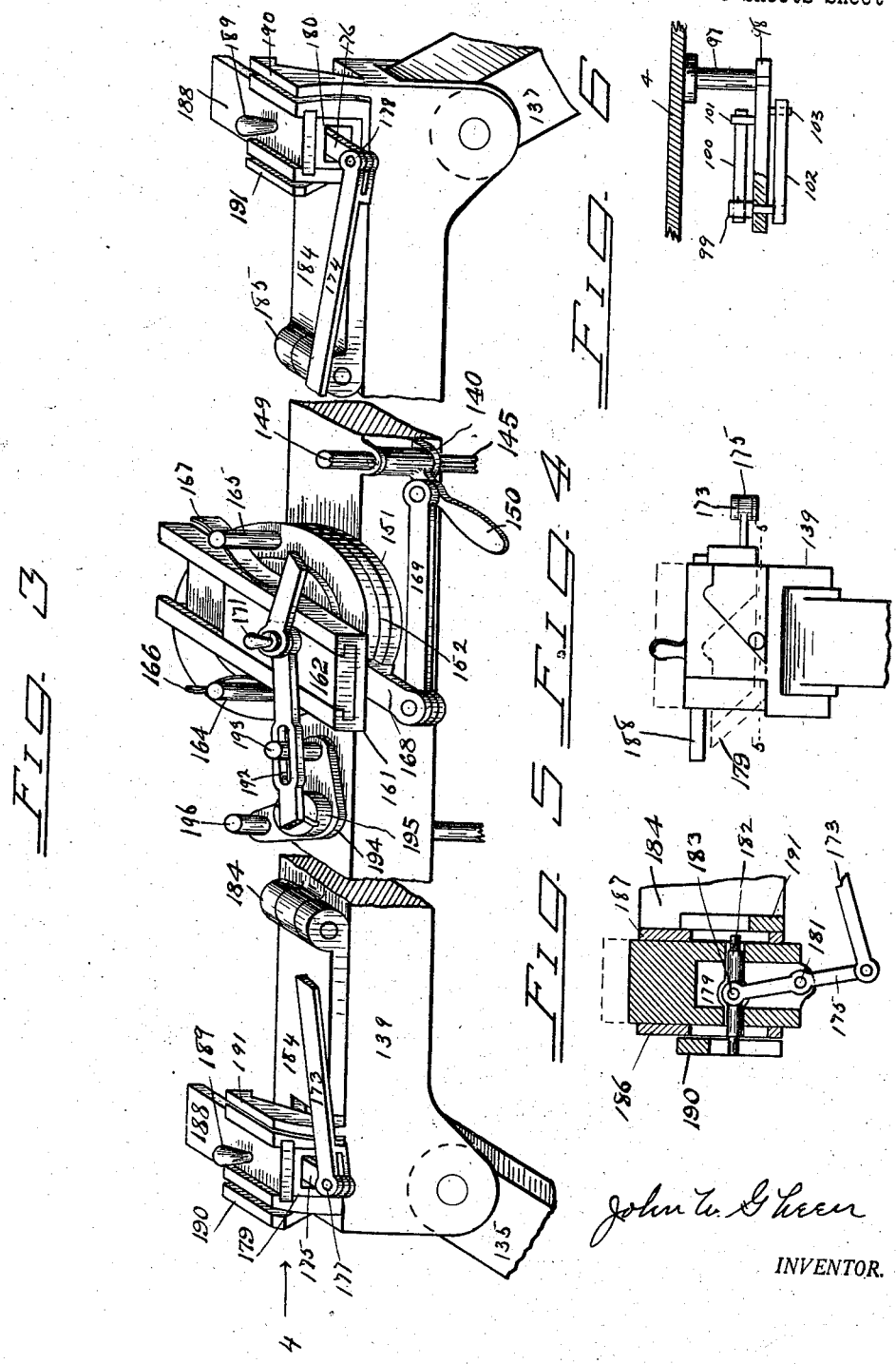

Sept. 4, 1923.
J. W. GHEEN
1,466,876
MACHINE FOR DISPLAYING RUGS, CARPETS, AND OTHER LIKE ARTICLES
Filed April 11, 1921
5 Sheets-Sheet 3
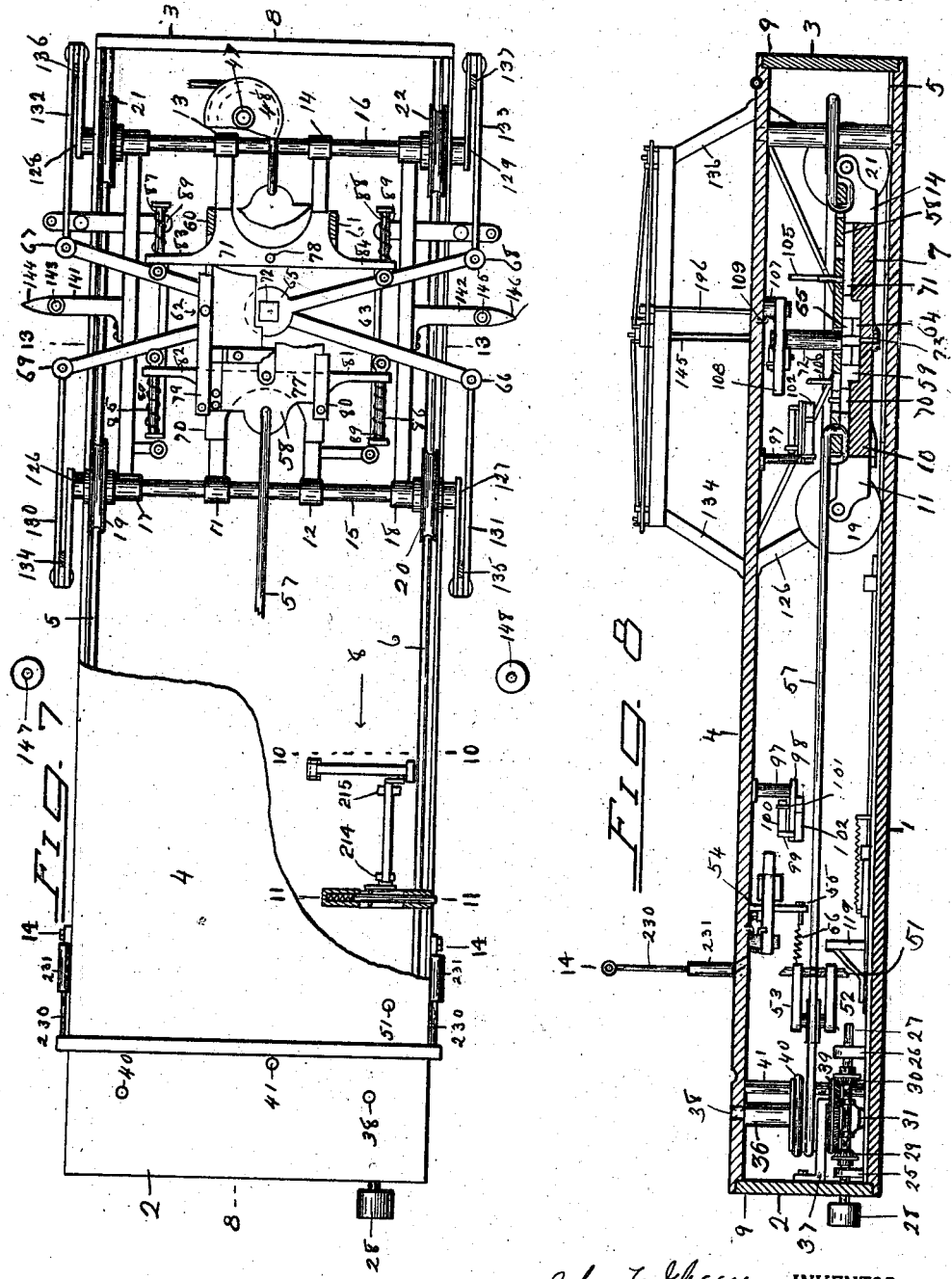
John W. Gheen INVENTOR.

Sept. 4, 1923.
J. W. GHEEN
1,466,876
MACHINE FOR DISPLAYING RUGS, CARPETS, AND OTHER LIKE ARTICLES
Filed April 11, 1921   5 Sheets-Sheet 4
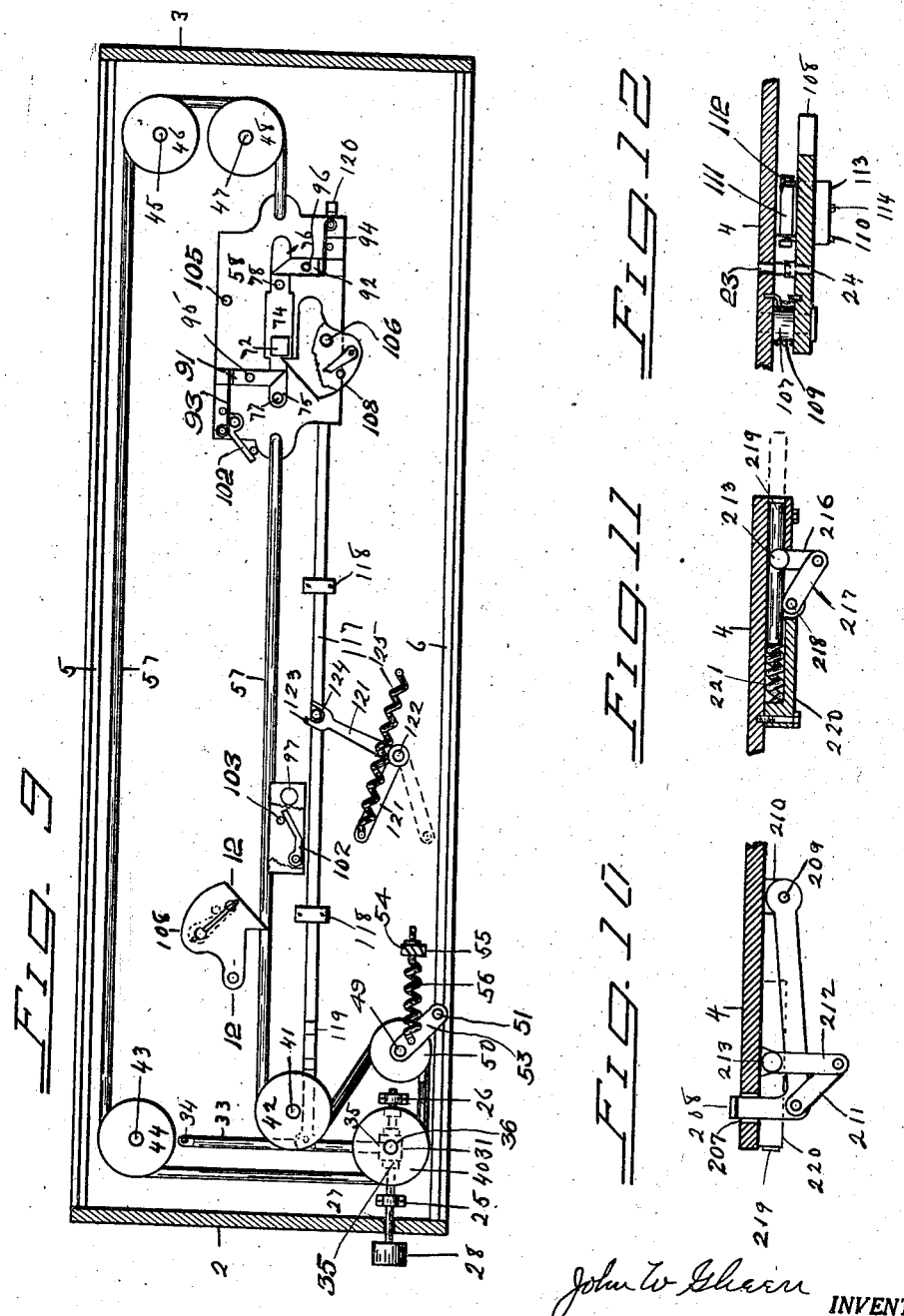
INVENTOR.

Sept. 4, 1923.
J. W. GHEEN
1,466,876
MACHINE FOR DISPLAYING RUGS, CARPETS, AND OTHER LIKE ARTICLES
Filed April 11, 1921   5 Sheets-Sheet 5
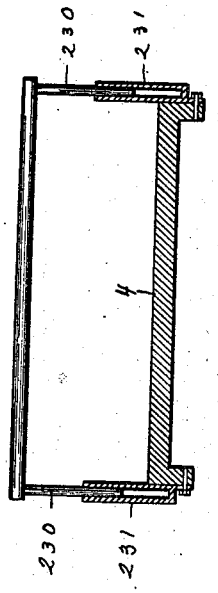
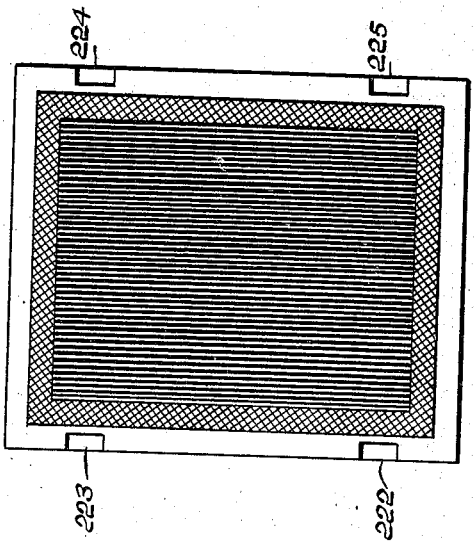
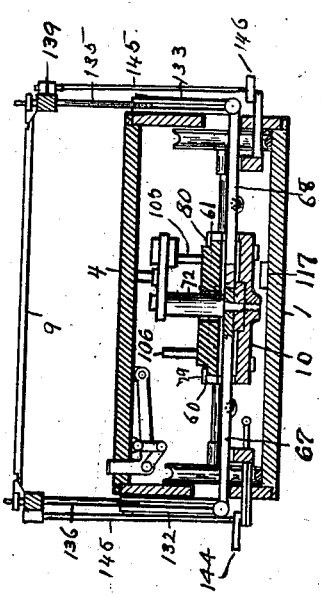
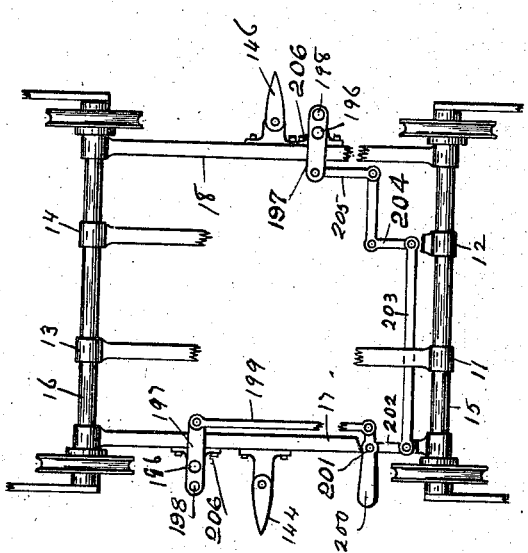
John W. Gheen INVENTOR.

Patented Sept. 4, 1923.

1,466,876

UNITED STATES PATENT OFFICE.

JOHN W. GHEEN, OF LOS ANGELES, CALIFORNIA.

MACHINE FOR DISPLAYING RUGS, CARPETS, AND OTHER LIKE ARTICLES.

Application filed April 11, 1921. Serial No. 460,280.

*To all whom it may concern:*

Be it known that I, JOHN W. GHEEN, a citizen of the United States of America, residing in the city of Los Angeles, county of Los Angeles, and State of California, have invented a new and useful Machine for Displaying Rugs, Carpets, and Other like Articles.

This application is a continuation of or a substitute for and an improvement upon my application for machine for displaying rugs, carpets and other like articles, filed October 27, 1919, Serial #333,720½.

The object of my invention is to provide a machine having a reciprocating carriage to automatically transfer rugs, carpets or other like articles from one pile to another in order that the tops of top articles may be exhibited; second, to make a machine that may take the articles from the top of one pile, one at a time, and deposit the articles one at a time in another; third, to make a machine that may take any number of articles from a pile at one time and deposit these articles in another pile; fourth, to provide a machine that shall automatically reverse as the bottom of one pile is reached and thus return the articles taken from the other pile to the first pile.

I attain these objects by means of the mechanism illustrated in the accompanying drawings.

Fig. 1 is a perspective of a machine for displaying rugs, carpets, and other like articles and embodying the principles of my invention.

Fig. 2 is an enlarged fragmentary vertical longitudinal sectional detail of the reversing slide shown in the central portion of Fig. 3.

Fig. 3 is an enlarged fragmentary perspective of the mechanism for handling the front side of the carrying frame, as shown in Fig. 1.

Fig. 4 is an enlarged end elevation of the gripper mechanism shown in Fig. 3, looking in the direction indicated by the arrow 4.

Fig. 5 is a horizontal sectional detail on the line 5—5 of Fig. 4, and looking downwardly as indicated by the arrow.

Fig. 6 is a vertical section of the carriage locking dog.

Fig. 7 is top plan view of the platform with one end broken away to show the carriage parts, the power mechanism shown in Fig. 9 being omitted.

Fig. 8 is a sectional and front elevation as indicated by the line 8—8 of Fig. 7.

Fig. 9 is a horizontal sectional detail on a plane parallel with Fig. 8 and on the line 9—9 of Fig. 8 showing the power and carriage reversing mechanism, the sliding plate and the carriage holding dog.

Fig. 10 is a sectional detail of the gripper reversing levers on the line 10—10 in Fig. 7 looking in the direction indicated by the arrow 8 in Fig. 7.

Fig. 11 is a sectional detail of the gripper reversing mechanism on the line 11—11 in Fig. 7 looking in the direction indicated by the arrow 8.

Fig. 12 is a sectional detail of one of the dogs for holding the carriage while the article is being raised or lowered the view being taken on the line 12—12 of Fig. 9.

Fig. 13 is a vertical cross section on the line 13—13 of Fig. 7.

Fig. 14 is a vertical cross section through the platform on the line 14—14 of Figs. 7 and 8 and showing a spacing rod up as in use; the spacing rods being shown down out of use in Fig. 7.

Fig. 15 is plan view of the carriage frame showing the lower arrangement of the automatic pile reversing mechanism.

Fig. 16 is a plan view of an article carrying frame with the article in place to be carried.

The solid base 1 is built of lumber and is flat and rectangular and of any desired size or plan. The end pieces 2 and 3 are built rigid with the ends of the base 1 and extend upwardly. The platform 4 is rigidly mounted upon the end pieces 2 and 3 above the carriage.

The track rails 5 and 6 are secured to the base 1 at its sides and extend from end to end of the base. The carriage 7 is adapted to move back and forth upon the track rails 5 and 6 over the base 1. The length of the platform 4 is sufficient for the first pile 8 and the second pile 9 of rugs, carpets or other similar articles and the carriage is operated under the platform 4 and under the piles 8 and 9.

The details of the carriage are, as follows:

The bed plate 10 has supporting arms 11 and 12 extending one way, and similar supporting arms 13 and 14 extending the other way in horizontal planes. The rigid axle 15 extends through the outer ends of the arms 11 and 12, and the rigid axle 16 extends through the outer ends of the arms 13 and 14, said axles being parallel and crosswise of the machine. The side bars 17 and 18 are parallel with the arms 11, 12, 13 and 14, and the ends of the axles 15 and 16 are rigidly fixed through the ends of the side bars 17 and 18. The grooved wheels 19 and 20 are loosely mounted upon the ends of the axle 15 and the grooved wheels 21 and 22 are loosely mounted upon the ends of the axle 16, and wheels 19 and 21 run upon the track rail 5 and the wheels 20 and 22 run upon the track rail 6.

The power mechanism is located under the platform 4 upon the base 1 and operates the carriage and the handling mechanism; the details of the power mechanism are as follows:

Bearings 25 and 26 are fixed upon the base 1 and the driving shaft 27 is mounted in these bearings and extends through the end piece 2 and has a driving pulley 28 upon its outer end.

Beveled pinions 29 and 30 are mounted loosely upon the driving shaft 27 with their points toward each other. The clutch 31 is slidingly splined upon the driving shaft 27 between the pinions 29 and 30. The clutch 31 is adapted to slide back and forth a short distance between the pinions 29 and 30 and to drive the pinions alternately. A lever 33 is connected to the base 1 by a pivot pin 34 inserted through its rear end and a fork 35 extends from the forward end of the lever 33 straddle of the shaft 27 and in a groove in the clutch 31. A shaft 36 is rotably mounted with its upper end in the platform 4 and its lower end in a bracket 37 extending from the end piece 2. Upper end of the shaft 36 is reduced to a pintle 38. A bevel gear 39 is fixed upon the lower end of the shaft 36 between the pinions 29 and 30 so that when the clutch 31 is moved it will engage with the gear 29 and drive the shaft 36 one way and when the clutch is moved the other way it will engage with the gear 30 and reverse the motion of the shaft 36. A flanged sheave 40 is fixed upon the shaft 36 above the bracket 37. A shaft 41 is mounted vertically in the base 1 and platform 4 parallel with the shaft 36, and a sheave 42 is mounted upon the shaft 41 in the horizontal alignment with the sheave 40. A shaft 43 is mounted in parallel with the shaft 41 and a sheave 44 is mounted upon the shaft 43 in horizontal alignment with the sheave 40. A shaft 45 is mounted in longitudinal alignment and parallel with the shaft 43 and at the other end of the machine, and a sheave 46 is mounted upon the shaft 45 in alignment with the sheave 44. A shaft 47 is mounted in transverse alignment with the shaft 45 and a sheave 48 is mounted upon the shaft 47. A tightener shaft 49 is mounted between the shafts 36 and 41 and slightly out of line and a tightener sheave 50 is mounted upon the shaft 49 in alignment with the pulley 40 and the sheave 42. A shaft 51 is mounted in the base 1 and platform 4, links 52 and 53 are mounted upon the shaft 51. The shaft 49 connects the swinging ends of the links and holds the tightener sheave 50 in alignment with the pulley 40, and the sheaves 40, 42, 44, 46 and 48. A bracket 54 is fixed to the platform 4, an adjusting screw 55 is mounted in the bracket 54, and a spring 56 connects the adjusting screw 55 to the link 53. A cable 57 passes one turn and a quarter around the pulley 40 and one end passes around the outer side of the sheave 44, then around the outer sides of the sheaves 46 and 48, and the other end passes around the outer side of the tightener sheave 50 and around the outer side of the sheave 42, the ends of the cable are between the sheaves 48 and 42. The connecting plate 58 has the ends of the cable 57 fixed to its opposite ends the cable being drawn taut and the tension of the cable being adjusted by the screw 55.

The details of the handling mechanism are as follows:

The bed plate 10 has a recess 59 formed at the center of its upper face. Flanges 60 and 61 extend upwardly from the sides of the bed plate 10, said flanges being cut away or omitted at points in transverse alignment with the recess 59 to form slots 62 and 63. A handling-lever hub 64 fits in the recess 59, a second handling-lever hub 65 fits upon the hub 64, handling-lever arms 66 and 67 extend from the hub 64 and handling-lever arms 68 and 69 extend from the hub 65. The arms 66 and 67 and the hub 64 extend in a straight line and form one handling-lever, and the arms 68 and 69 and the hub 65 extend in a straight line and form the second handling-lever. A sliding spring holder plate 70 fits upon one end of the bed plate 10 under the connecting plate 58 and in the same plane as the handling-levers. A second similar spring-holder plate 71 is similarly located on the other end of the bed plate 10. A post 72 has a pintle 73 extending downwardly through the hubs 64 and 65 and into the bed plate 10 to form a pivot for the handling-levers. The connecting plate 58 fits slidingly upon the plates 70 and 71 and has a central longitudinal slot 74 through which the post 72 extends. Slots 75 and 76 extend from the ends of the slot 74, and pins 77 and 78 are fixed in the plates 70 and 71 and extend upwardly through the slots 75 and 76. The connecting plate 58 slides between the flanges 60 and 61. Cap plates 79 and 80 are secured to the flanges 60 and 61 to hold the connecting plate 58 in place. Arms 81 and 82 extend from the plate 70 through the slots 62 and 63, and similar arms 83 and 84 extend from the plate 71. Rods 85 and 86 extend through the arms 81 and 82 and are pivotally connected to the handling-lever arms 66 and 60 and similar rods 87 and 88 extend through the arms 83 and 84 and are connected to the handling-lever arms 67 and 68. Springs 89 are placed upon the rods 85, 86, 87 and 88 passing upon the arms 81, 82, 83 and 84 and engaging spring seat nuts that are mounted upon the free ends of the rods 85, 86, 87 and 88, the tensions of the springs being exerted to hold the plates 70 and 71 towards the handling-levers. Latches 91 and 92 are mounted in T-slots formed in the connecting plate 58, the points of the latches passing transversely across the planes of the slots 75 and 76 and the points of the latches being oppositely beveled with their straight faces towards each other. Leaf springs 93 and 94 are mounted upon the plate 58 and engages the latches 91 and 92 to press the latches inwardly. Cam pins 95 and 96 extend upwardly from the latches 91 and 92. The pins 77 and 78 extend into the planes of the latches 91 and 92. Brackets 97 extend downwardly from the platform 4. The plate 98 is mounted on the lower end of the bracket 97, a stub shaft 99 extends through the plate 98, a leaf spring 100 is fixed to the upper end of the stub-shaft 99 and engages the stop pin 101, a pivot cam 102 is fixed upon the lower end of the stub-shaft 99 and engages a stop pin 103, so that the cam pin 95 will engage the pivot cam. The pivot cams 102 and 104 have faces inclined relative to a transverse line of the connecting plate 58. When this moves to the left as in Fig. 9, the catch pin 96 will pass under or behind the pivot cam 102, the spring yielding. The catch pin 96 will strike the top or front of the pivot cam 104 and will slide along the inclined face of the dog 104, thereby moving the latch 92 away from the slot 76 until the latch 92 passes the pin 78 and then the latch is released. In a like manner the pivot cam mechanism operates the latch 91. It will be observed that the sliding plate travels after the carriage stops, and moves before the carriage starts in order to raise and lower the shelf links.

The following has reference principally to the carriage locking dogs shown in Figs. 9 and 12, the pivot cam being shown in a broken away portion of the carriage holding dog. Pins 105 and 106 extending upwardly from the connecting plate 58 operate the carriage holding dog. A post 107 extends downwardly from the platform 4. The carriage holding dog 108 is pivotally mounted upon the post 107 to swing horizontally and has a tooth adapted to engage the post 72, one side of the tooth being beveled to pass the post 72 and the other side of the tooth being straight to hook on to the post 72 to hold the carriage temporarily. A coil spring 109 engages the dog 108 and the platform 4 to hold the dog in position. A stub-shaft 110 is mounted through the dog 108, a leaf-spring 111 is fixed to the upper end of the shaft 110 and engages a stop 112. A pivot cam 113 is fixed to the lower end of the stub-shaft 110 and engages a stop 114 to limit its swing one way. The cam 113 stands at an incline relative to a longitudinal line and is in position to be engaged by the pin 105. When the connecting plate 58 moves in the direction of the driving mechanism in Fig. 9, the pin 106 will engage the front side of the cam 113, the stop 114 will hold the cam 113 and the pin 106 will move the dog out of engagement with the post 72. When the travel of the carriage reverses the pin 105 engages with the back of the inclined cam 113 passing by the cam, which is held in position by spring 111. The post 72 engages with the beveled end of the cam 113, causing it to move until the post 72 passes the hook point when the action of the coil spring 109 locks the cam dog. The pin 23 in the lower side of the platform 4 engages with the pin 24 in the upper side of the dog 108 forming a stop to limit the swing of dog. The following describes the construction of the mechanism that reverses the travels of the carriage referring to Figs. 8 and 9. A reversing bar 117 extends longitudinally nearly from end to end upon the base 1 and is held to slide through U-clips 118 and is connected at one end to the intermediate portion of the lever 33. Operating brackets 119 and 120 extend upwardly from the bar 117 to be engaged by either end of the connecting plate 58. A bell-crank lever 121 is mounted upon a pivot 122 and has a yoke 123 engaging a pin 124 fixed in the bar 117, and a spring 125 is connected to the opposite side of the lever 121 and to the base 1 so as to snap back and forth past the pivot 122. The extreme movement of the connecting plate 58 engaging the bracket 119 or 120 moves the reversing bar 17, and the pivoted lever 33 and clutch 31 causing the engagement of the pinions 29 or 30 changing the direction of the movement of the carriage.

The rug frame handling mechanism, is mounted upon the carriage axles and is operated by the power mechanism, and the details are as follows:

The links 126 and 127 on one end are pivoted to the axle 15 and on the other to one end of the toggle bars 130 and 131 and the lower end of links 134 and 135. The links 128 and 129 are mounted on one end to the axle 16 and on the other to one end of the toggle bars 132 and 133 and the lower end of links 136 and 137. The other ends of the toggle bars 130, 131, 132 and 133 are connected to handling lever arms 69, 66 and 67 and 68 respectively. The upper ends of the links 135 and 137 are connected pivotally to shelf link 139. As the handling lever arms are forced together the shelf links are horizontally raised. The springs 89 allow for a variation in the height of the piles. A second shelf link shown in Fig. 8 connects the upper ends of links 134 and 136. A bifurcated bearing 140 projects outwardly from near the center of the shelf link 139 and a similar bearing, not shown, extends outwardly from the center of the second shelf link. Bearing arms 141 and 142 extend horizontally outwardly from the center of the side bars 17 and 18. A rock-shaft 145 is mounted slidingly in the bearings 140 and 142. A crank 146 is fixed to the lower end of the shaft 145 and extends outwardly. A second similar rock-shaft 143 and crank 144 is mounted at the outer end of the bearing arm 141 and in the second shelf link. Operating pins 147 and 148 are fixed at the longitudinal center and outside of the base to engage the cranks 144 and 146 as the carriage travels and to rock the shafts 143 and 145. The rock-shaft 145 has a key-way 149 extending a considerable distance from the upper end and the rock-shaft 143 has a similar key-way. A crank-arm 150 is mounted in the bifurcation of the bearing 140 on the shelf link 139 and is slidingly splined upon the rock-shaft 145. A similar crank-arm is mounted upon the rock-shaft 143 in the bifurcation of the bearing of the second shelf link.

Referring principally to Figs. 2, 3, 4 and 5 the details for operating gripper cam pins of the mechanism carried by the first shelf link 139 are, as follows:

A bearing is formed at the centre of the shelf link 139 and has a vertical opening through a horizontal supporting face. An arm ring 152 rests upon the washer 151. A hub 153 on the T-slot extends through the arm rocker ring 152, the washer 151 and through the bearing shelf. A flange 154 extends from the hub 153 and rests upon the arm ring 152. An arm plate 155 which fits against the bottom of the shelf link 139 and is secured against the end face of the hub 153 by screws. An arm extends from the arm plate 155. A connecting rod 157 is connected at one end to the arm plate by a pivot screw 158. A projection 159 extends from the opposite end of the connecting rod 157 and engages a spring 160. This spring not only holds the T-slot in proper position but prevents breakage in case the gripper cam pins should fail to register. The T-slot head 161 is formed integral with the hub-shaft 153 and the T-slot normally is crosswise of the machine. A T-slot slide 162 works in the T-slot. The arm rocker ring 152 has pins 164 and 165 extending upwardly. Leaf-springs 166 and 167 are fixed to the sides of the head 161 and engage the pins 164 and 165 so as to provide a slight yielding motion between the head 161 and the ring 152, insuring the proper engagement of the cranks 144 and 145 with the pins 147 and 148. An arm 168 extends from the ring 152. Connecting rod 169 connects the arm 168 to the crank arm 150. A pivot handle 171 is tapped downwardly into T-slide 162 and extends through the overlapping ends of reversing rods 173 and 174. The plug 156 lies in a depression in the T-slot slide 162 to prevent slipping.

The following has reference to the gripping mechanism which grips and releases the rug frame as shown, principally in Figures 3, 4 and 5. While there are four rug frame grippers on each machine, for the purpose of clearness, only two are described as the others are of the same construction and perform the same operation; only one shelf link is described for this same reason.

The reversing rods 173 and 174 are connected to the cam pin levers 175 and 176 by pins 177 and 178 passing through the slotted ends of the rods 173 and 174 and through the eye in the ends of the cam pin levers 175 and 176. The grippers 179 and 180 are made hollow on the outer end to receive the cam pin levers which are attached by the pivot pin 181 passing through the top and bottom sides of the gripper and through the cam pin lever. The inner ends of the cam pin levers 175 and 176 are slotted to receive the cam pin 182 and connected by the pin 183 passing a slightly elongated slot in the flattened sectional portion of the cam pin 182. A hole in the grippers at the right and left sides forms the support for the cam pins.

The gripper frame 184 rests upon the shelf link 139 and is secured thereto by the hinged joint 185. The U shaped housing 186 and 187 and the bottom of the gripper frame form the sliding slot for the gripper 179. The top stop 188 is mounted slidably in the U sides of the gripper frame, the handle 189 is for the manual operation of this stop. When the spacing rods 226, 227, 228 or 229 are used, these stops are slipped into the space formed by the spacing rods, and the rugs above the stops are lifted at one time; the stationary cams 190 and 191 are an integral part of the shelf link 139, and engage alternately with the cam pin 182, operating the gripper 179 when the stop 188 engages with a rug frame. The distance between the stop 188 and the gripper 179 is equal to the thickness of the rug frame, so that only the top frame is caught to each operation.

The object of the spacing rods is to provide a means whereby any number of rugs may be lifted at one time, in order that a particular rug may be readily exhibited.

The following refers to the mechanism for reversing the action of the grippers in order that the picking up and depositing of the rugs may be reversed, and refers to Figs. 1, 31, 10, 11 and 15.

The reversing rod 173 has a slotted opening 192 to receive the bell crank pin 193; the bell crank 194 is secured to the link shelf 139 by the filaster head screw 195 to allow a rocking motion. The rock-shaft 196 passes through the inside arm of the bell crank 194 and is secured to the reversing bar 197 at the base of the carriage, the side bars 17 and 18 have projections 206 to which the bars 197 are pivotally secured by the pin 198 being in vertical alignment with the screw 195. On the link shelf 139 the inner end of one of the reversing bars 197 is pivoted to one end of the flat connecting rod 199, the other end is pivoted to the handled bell crank 200 which is mounted to rock on the pivot 201 on the frame 17.

To the arm 202 of the handled bell crank is pivoted one end of the connecting rod 203. The other end of this rod is connected to one arm of the bell crank 204 which is mounted on a projection of the carriage arm 12. To the other arm of the bell crank 204 is pivoted one end of the connecting rod 205, the other end is connected to the bar 197.

In the platform 4 is an opening 207, Fig. 1 and another under the rug pile 9 and through one end of which the bent pile reversing arm 208 projects after the bottom rug has been removed. The other end of the arm 208 is secured by a pin 209, which passes through the projections 210 of the platform 4. To the angle of the arm 208 is pivoted one end of the link 211. The other end is pivoted to the crank 212 to which is attached one end of the shaft 213. The shaft is supported by the boxes 214 and 215 which are secured to the platform 4; to the other end of the shaft 213 is attached the crank 216 which is attached to one end of the connecting link 217, the other end of link 217 is secured by the pin 218 in slotted projection on the pile reversing bar 219 which is constructed to slide in the case 220, which case is secured to the platform 4, a pocket is formed by the extra depth of the case 220 in which the spring 221 is inserted so that when the last rug frame is removed the pressure of the spring will cause the reversing bar 219 to be projected into the travel of the carriage and engage with the shaft 196, acting on the bell crank 194 through the pin 193 and reversing rod 173, changing the position of the slide 162 reversing the position of the cam pins 182.

The following has reference to frames for holding the rugs as shown in Fig. 16. Metal bands of suitable thickness and width form a frame work. The open space is covered with cloth so that a rug of any size may be laid thereon. The parts 222 and 223, 224 and 225 are bare in order that grippers may work freely.

The following has reference to the mechanism involved in lifting a number of rugs at one time. The spacing bars 226, 227 228 and 229 when not in use lay in recesses in the platform 4.

Projecting from the spacing bar ends are rods 230 which telescope in the cylinderical pivoted pockets 231 and are secured to the sides of the platform 4 by means of the screws inserted on the pivot ends. When in use the bars are placed on either end of the rug frame so that the next rug frame deposited on the spacing bars thus will leave an opening between the rug frames. The stops 188 are inserted in the space and a number of rugs are moved at one time.

This provides means for uncovering a certain rug at one operation, regardless of the number of rugs which may have been piled on top of it.

I claim:

1. A machine for displaying rugs, carpets and like articles, comprising a track, a carriage upon the track, means for moving the carriage back and forth upon the track, a platform above the track and adapted to support articles, and means whereby the carriage takes articles from one position upon the platform and deposits the articles in another position upon the platform.

2. A machine for displaying rugs, carpets and like articles comprising a track, a carriage upon the track, a platform above the track and having space for two piles of articles, means for moving the carriage back and forth, means for picking up the articles from one pile and depositing the articles in the other pile, and means whereby the picking up and depositing mechanism is reversed when the bottom of a pile is reached.

3. A machine for displaying rugs, carpets and like articles and having a carriage adapted to move articles, in a horizontal plane, from one position and deposit the articles in a second position and means for automatically reversing the operation so as to move the articles from the second position back to the first position.

4. A machine for displaying rugs, carpets and like articles comprising a track, a carriage upon the track, a platform above the track and having space for two piles of articles, means for moving the carriage back and forth, means for picking up the articles from one pile and depositing the articles in the other pile and means whereby the picking up and depositing mechanism is reversed when the bottom of a pile is reached, and means whereby any particularly desired article may be uncovered at one operation.

JOHN W. GHEEN.